May 24, 1955     C. H. LITTLE     2,708,791

DRAFTING MACHINE

Original Filed May 3, 1947     4 Sheets-Sheet 1

INVENTOR.
CHARLES HUBBARD LITTLE
BY Hudson, Boughton,
Williams, David & Hoffmann
ATTORNEYS May 24, 1955 C. H. LITTLE 2,708,791
DRAFTING MACHINE
Original Filed May 3, 1947 4 Sheets-Sheet 2

INVENTOR.
BY CHARLES HUBBARD LITTLE
ATTORNEYS

May 24, 1955  C. H. LITTLE  2,708,791
DRAFTING MACHINE

Original Filed May 3, 1947  4 Sheets-Sheet 3

INVENTOR.
CHARLES HUBBARD LITTLE
BY Hudson, Boughton,
Williams, David & Hoffmann
ATTORNEYS May 24, 1955  C. H. LITTLE  2,708,791
DRAFTING MACHINE Original Filed May 3, 1947  4 Sheets-Sheet 4

INVENTOR.
CHARLES HUBBARD LITTLE
BY Hudson, Boughton,
Williams, David & Hoffmann
ATTORNEYS United States Patent Office 2,708,791
Patented May 24, 1955

2,708,791

DRAFTING MACHINE

Charles Hubbard Little, Chagrin Falls, Ohio, assignor to Universal Drafting Machine Corporation, Cleveland, Ohio, a corporation of Ohio Original application May 3, 1947, Serial No. 745,800, now Patent No. 2,662,291, dated December 15, 1953. Divided and this application November 16, 1953, Serial No. 392,241

3 Claims. (Cl. 33—79)

The present invention relates to drafting and like machines comprising a parallel motion arm having an instrument or protractor head at one end, including indexible members, and to indexing mechanisms generally. This application is a division of my copending application Serial No. 745,800, filed May 3, 1947, now Patent No. 2,662,291, issued December 15, 1953.

One of the objects of the invention is the provision of a novel and improved drafting machine or similar device having a parallel motion mechanism or arm, one end of which is adapted to be connected to a drawing board or the like, and an instrument head operatively connected to or forming a part of the other end of the parallel motion arm, which device will be accurate in operation but relatively light in appearance and construction and in which the overall height of the instrument head will be a minimum.

Another object of the invention is the provision of a novel and improved drafting machine or similar device comprising a parallel motion mechanism having an instrument head at one end including a rotatable spindle, a hand grasp operatively connected to the upper end of said spindle, an instrument holding member rotatably supported adjacent to the opposite end of said spindle, a dish-shaped, resilient member connected to the lower end of the spindle and engageable within an annular aperture or recess in the instrument holding member for clamping said instrument holding member to said spindle, and means for producing relative movement between said instrument holding member and the spindle in a direction axially of the spindle to clamp and unclamp the instrument holding member to the spindle.

Another object of the invention is the provision of a novel and improved drafting or instrument head comprising two relatively rotatable members, and means of the character referred to for clamping the same together in various positions.

The invention resides in certain constructions and combinations and arrangements of parts and further objects and advantages will be apparent to those skilled in the art to which the invention relates from the following description of the preferred embodiment described with reference to the accompanying drawings forming a part of this specification in which similar reference characters designate corresponding parts, and in which Fig. 1 is a plan view of the drafting machine embodying the present invention, attached to a drawing board;

Figure 1:
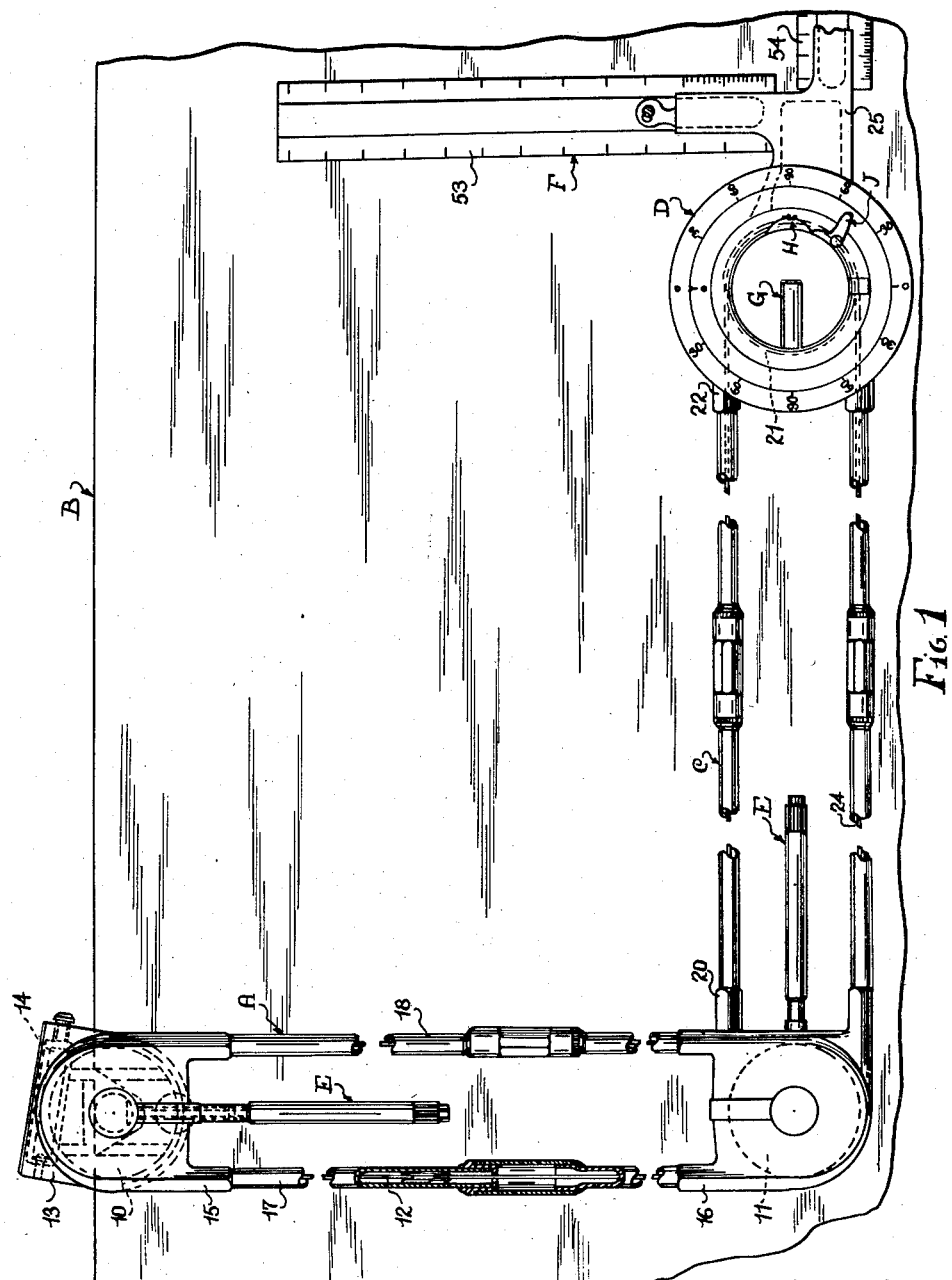

The drafting machine shown in the drawings, which is the preferred embodiment of the invention, comprises a two-section, parallel motion mechanism or arm of the wheel and band type having one end adapted to be detachably connected to a drawing board and the other end which is adapted to be moved about the drawing board provided with a protractor or instrument head built into the parallel motion wheel at the free end of the arm. Alternatively the protractor or instrument head can be made as a separate unit and attached to the parallel motion wheel at the free end of the arm. The parallel motion mechanism or arm shown comprises two angularly movable sections, each comprising a pair of wheels of equal diameter encircled by a flexible band; however, any number of sections may be employed.

The upper or anchor section of the parallel motion arm comprises wheels 10, 11 encircled by an endless band 12 and held in spaced relation by an expandible strut A operatively connected thereto for relative rotation with respect to the strut. The upper wheel 10 is formed integral with a member 13 pivotally connected to a bracket member 14 forming a part of the anchor assembly, which bracket member is adapted to engage over the upper edge of the drawing board, designated generally by the reference character B, and be detachably fixed thereto by a clamp screw located underneath the drawing board.

The strut A comprises yoke or yoke members 15, 16 located at the anchor and elbow ends, respectively, and connected together and held in spaced relation by tubular side portions or members 17, 18. The anchor yoke 15 is rotatably connected by antifriction bearings to the member 13 in such a manner that the strut A is supported for rotation about the center of the wheel 10 as an axis. The yoke 16 at the elbow of the arm is pivotally connected to the wheel 11 for rotation about the center thereof as an axis. The wheel 11 is formed integral and concentric with a wheel, not shown, forming a part of the protractor section of the parallel motion arm, that is, the section adjacent to the protractor head and rulers, etc. The two yoke members 16, 20, the latter being the yoke member of the strut C of the protractor section at the elbow of the arm, are pivotally connected with respect to each other and the wheel assembly at the elbow of the arm by antifriction bearings in a manner similar to that in which the yoke 15 is rotatably connected to the wheel 10.

The protractor section of the parallel motion arm comprises, in addition to the wheel located at the elbow, previously mentioned, a wheel 21 of equal diameter therewith and held in spaced relation with respect thereto by the strut C. The strut C is similar in construction to the strut A and includes a yoke member 22 to which the wheel 21 is pivotally connected by an antifriction bearing 23, see Figs. 3 and 4. The wheels of the protractor section of the arm are encircled by an endless band 24 similar to the band 12. In the embodiment shown, the wheel 21 located at the free end of the parallel motion arm forms a part of the instrument head, designated generally as D, or, conversely, the instrument head is a part of the parallel motion arm. Alternatively, the instrument head may be constructed as a separate unit and detachably secured to the wheel 21.

The parallel motion mechanism is not herein shown and described in detail but is similar to that disclosed and claimed in United States Patent No. 2,519,147 issued August 15, 1950, on my copending application Serial No. 649,861, filed February 25, 1946, entitled "Drafting Machine," and comprises individual counterpoise means E for each section thereof.

Generally speaking, the instrument head D shown comprises an instrument or ruler assembly F including an instrument holding member or ruler chuck arm 25 adjustably connected by clamp mechanism to a spindle 26 rotatably supported in the parallel motion wheel 21 at the free end of the parallel motion mechanism coaxially with respect to the wheel 21; index mechanism H for indexing the ruler or instrument assembly with respect to the wheel 21; clamp mechanism J for clamping the ruler assembly in any desired angular position with respect to the wheel 21; and a protractor assembly for indicating the angular position of the ruler assembly. The protractor shown comprises a normally stationary, graduated protractor ring or element 29 formed integral with the member or assembly within which the instrument assembly is rotatably supported which, in the embodiment shown, is the wheel member 21. If desired, the protractor ring 29 may be made as a separate element and adjustably fixed with respect to the wheel 21 for the purpose of changing the angle of the base or reference line of the drawing, etc. In addition to the protractor ring 29, the wheel member 21 comprises a radially inwardly extending flange 30 formed integral therewith and to which flange the movable protractor element or plate 31 is adapted to be clamped by the protractor clamp assembly J.

The clamp J shown comprises a clamp member 32 located underneath the movable protractor element or plate 31 and threaded upon the lower end of a screw 33 projecting through a suitable aperture in the protractor plate 31. The head of the screw 33 which is located above the protractor plate 31 is knurled and provided with a bell crank-like handle member 34 for facilitating rotation thereof. The radial outer end of the clamp member 32 extends underneath the flange 30 on the wheel member 21 and the inner end thereof engages between two downwardly extending projections on the underside of the protractor plate 37, which projections limit the rotation of the clamp member 32 about the screw 33. The construction is such that when the screw 33 is rotated in a clockwise direction, as viewed in Fig. 5, the flange 30 is securely clamped between the clamp member 32 and the undersurface of the protractor plate 31. Rotation of the screw 33 in the opposite direction unclamps the parts and permits rotation of the movable protractor plate 31 relative to the stationary protractor element 29 and the wheel 21. The stationary protractor element or ring 29 is located circumferentially of the movable protractor plate or element 31 and the construction is such that the adjoining portions thereof are flush. The movable protractor element 31 is provided with a dead line 36 and a vernier scale 37 for cooperation with a graduated scale 38 on the stationary protractor element or ring 29.

The spindle 26 is rotatably supported in the hub 40 of the wheel 21 by a pair of antifriction bearings 41, 42, the outer races of which abut each other and are held within the hub 40 by threaded rings 43, 44 located in suitably threaded counterbores in opposite ends of the hub. The antifriction bearings 41, 42 are assembled upon the spindle 26 from the top and the inner race of the antifriction bearing 42 abuts against a flange 46 formed upon the shaft or spindle 26 adjacent to the lower end thereof and the upper end of the inner race of the bearing 41 is engaged by the lower end of a sleeve-like member 47 pressed upon the spindle 26 above the bearing 41 and provided with a circumferential flange 48 intermediate the ends thereof. The upper end of the sleeve-like member 47 is engaged by the undersurface of the hub portion 50 of the movable protractor element or plate 31, which plate is fixedly pressed upon a knurled portion 51 of the spindle 26 and held assembled therewith by a nut 52 having threaded engagement with a threaded portion of the spindle 26 adjacent to the upper end thereof. The antifriction bearings 41, 42, the sleeve-like member 47 and the protractor plate 31 are assembled upon the spindle 26 from the upper end and are all held in assembled position by the nut 52 which clamps the same securely therebetween and the flange 46 adjacent to the lower end of the spindle.

The instrument holding plate or chuck arm 25 to which the rulers 53, 54 are detachably connected is rotatably connected to the lower end of a pin or rod 55 extending upwardly through the spindle 26 and having an enlarged head 56. The plate is adapted to be clamped to the lower end of the spindle 26 in any predetermined adjusted position by a dish-shaped plate or washer-like resilient member 57 secured to the lower end of the spindle 26 by a flange 58 on the spindle which is spun or peened over the member 57 after it has been assembled with the spindle. The perimeter of the member 57 engages against a circular shoulder 59 formed in the upper surface of the plate 25 by a counterbore therein.

Figure 5:
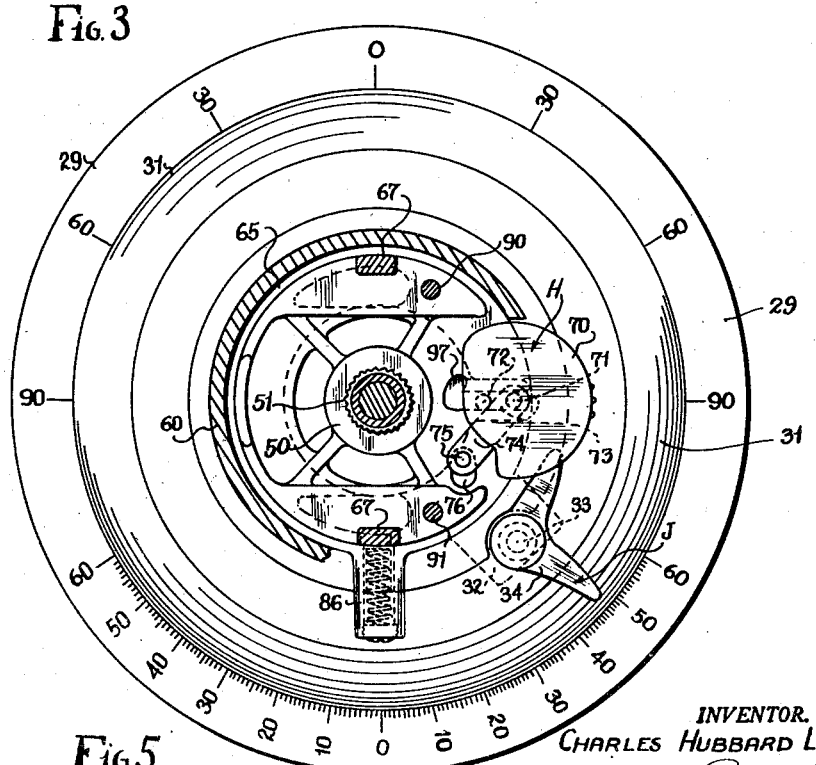
Fig. 5 is a sectional view approximately on the line 5—5 of Fig. 3.

The plate or chuck arm 25 is adapted to be raised, as viewed in Fig. 5, to tightly engage the circumference of the member 57 against the shoulder 59 and thus clamp the plate or chuck arm 25 to the lower end of the spindle 26 by manipulation of a lever 60 pivotally connected to the bifurcated upper end of the rod 55 by a pin 61. The lever 60 shown is made of a plastic and comprises a metal insert 62 molded therein, which member is provided with a cam-like surface 63 adapted to engage the upper end of the spindle 26 and draw the rod 55 in an upward direction when the lever is in the position shown in Fig. 3. The lever 60 is located in a cut-out portion in the hand grasp or handle proper 64 counterbored from the bottom to receive an upwardly extending flange 65 on the protractor element 31 to which the handle is secured by a plurality of setscrews 66 threaded into bosses 67 on the top of the flange. When the lever 60 is in position to clamp the chuck arm to the spindle 26, it is preferably flush with the surface of the handle proper. When the lever 60 is rotated in a clockwise direction, as viewed in Fig. 3, the rod 55 is free to move downward under the resiliency of the member 57 a limited amount, which amount is sufficient to permit relatively free rotation between the chuck arm 25 and the member 57, thus permitting adjustment of the rulers or other instruments, as the case may be, carried by the chuck arm to any desired base or reference line on the drawing or the like.

One of the principal advantages of the construction just described for clamping and unclamping the instrument holding member or ruler chuck arm 25 to and from the spindle 26, in addition to its simplicity of construction and ease of operation, is the fact that it is positive in operation and the tightening of the clamp has no tendency to alter the alignment of the rulers, etc. The cam-shaped end 63 of the lever 60 is such that the resiliency of the member 57 tends to hold it in either clamping or unclamping position. The lever 60 is normally parallel with the upper edge of the drawing board and the radially outer end preferably projects beyond the handle proper so that it can be raised by the little finger of the operator while the palm of the hand remains above the hand grasp 64.

The indexing mechanism H shown comprises an index pawl releasing member or thumb piece 70 slidably supported on the protractor plate 31 and projects outwardly from one side of the handle 64 through aligned apertures in the flange 65 and the handle. The thumb piece 70 is provided with a pair of downwardly projecting pins 71, 72 positioned radially with respect to each other and having their lower ends engaged within a radial slot 73 in the protractor plate 31. The pin 71 has pivotally connected thereto one end of a lever 74 movably supported upon the upper surface of the member 31 underneath the handle 64. The opposite end of the lever 74 is provided with a pin 75 fixed thereto, which pin projects downward through an elongated slot 76 in the member 31 where it is connected to an indexer or index notcher or pawl member 77 slidably supported on the flange 48 of the sleeve-like member 47 to the right of the spindle 26, as viewed in Figs. 3 and 6. The member 77 encircles a portion of the spindle 26 and opposite ends thereof are provided with downwardly extending projections 80, 81 which engage in diametrically opposite, face-type slots or ratchet teeth 82 formed in the upper end of a sleeve or ring-like member 83 pressed upon the cylindrical hub 40 of the wheel 21. The sides 84 of the slots 82 form gauging or locating surfaces on the wheel assembly for the indexing, as will be hereinafter apparent.

Figure 2:
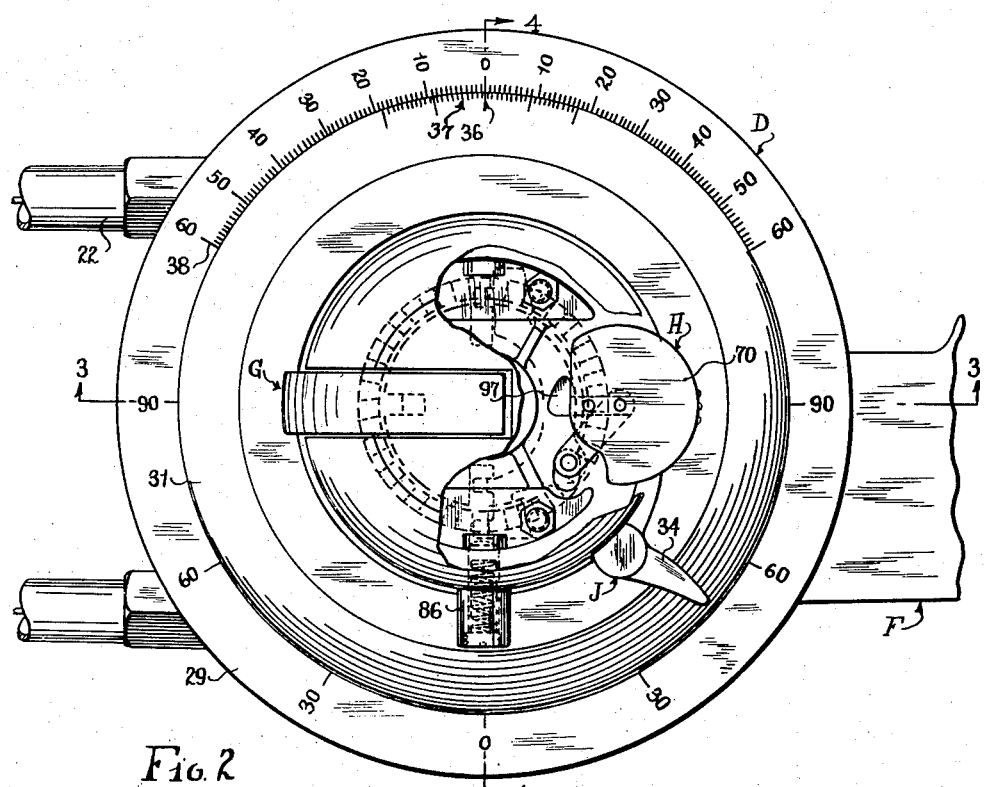
Fig. 2 is an enlarged plan view of the drafting head, with a portion of the handle proper broken away.
Figure 4:
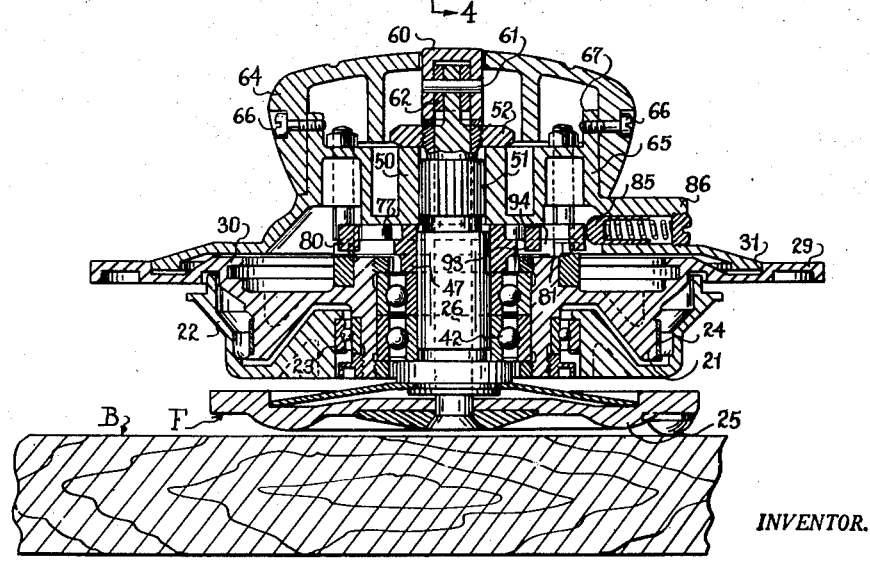
Fig. 4 is a sectional view, with portions in elevation, approximately on the line 4—4 of Fig. 2.
Figure 6:
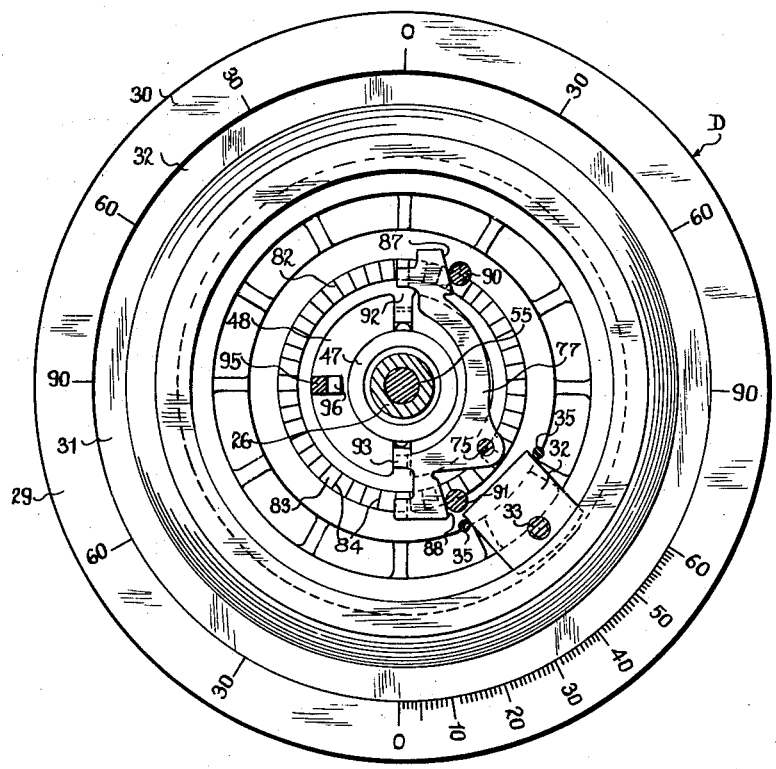
Fig. 6 is a sectional view approximately on the line 6—6 of Fig. 3.

The index notcher member 77 is continuously urged toward the rear or upper edge of the drawing, as viewed in Figs. 2, 5 and 6, or, toward the left, as viewed in Fig. 4, by a spring-pressed detent 85 slidably supported in a boss 86 formed integral with the protractor plate 31. The opposite ends of the index notcher 77 are provided with inclined or cam-like surfaces 87, 88 adapted to normally engage the lower ends of pins 90, 91, respectively, detachably connected to the protractor plate 31. Like the sides 84 of the slots 82, the surfaces of the pins 90, 91 form gauging or locating surfaces on the ruler assembly for the indexing. The construction is such that as the index notcher member 77 is urged in the direction previously mentioned by the spring-pressed detent 85, the inclined surfaces 87, 88, both of which are inclined in the same direction, cause the notcher member 77 to be pushed toward the left, as viewed in Fig. 6, thus tightly wedging and clamping the downwardly extending projections 80, 81 on the member 77 with the left-hand sides or gauging surfaces 84 of diametrically opposite index slots 82.

When the thumb piece 70 is depressed, movement of the lever 74 causes the pin 75 to travel along the slot 76 and move the index pawl 77 transversely of the axis of rotation of the instrument assembly against the spring-pressed detent 85 until the downwardly extending projections 80, 81 are clear of the index stops, whereupon the ruler assembly including the movable protractor element 31, may be rotated with respect to the wheel 21 and the stationary protractor element 30. When the downwardly extending projection 80 is moved to inoperative position, it engages within a slot 92 in the flange 48 of the member 47 which assists in guiding the index pawl. The pawl is also guided by a downwardly extending projection 93 formed on the opposite end thereof, which projection normally engages within a slot 94 in the flange 48 similar to the slot 92. In the embodiment shown, index slots 82 are spaced at fifteen degree intervals and facilitate setting the rulers, etc., to these angles. Obviously the indexing mechanism H may be omitted or the index slots may be located at any desired places or angles.

Figure 3:
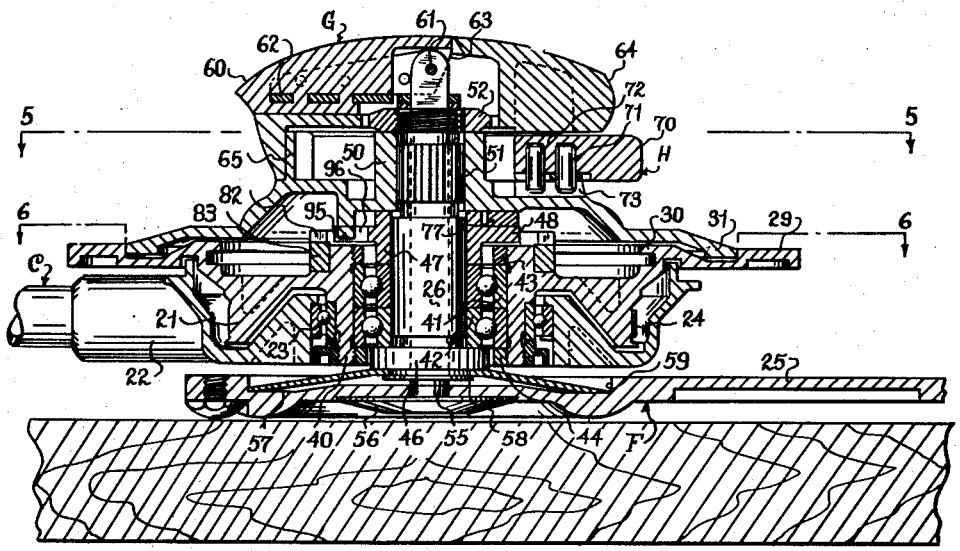
Fig. 3 is a sectional view, with portions in elevation, approximately on the line 3—3 of Fig. 2.

The protractor plate 31 is preferably assembled with the spindle 26 from the top after the bearings 40, 41 and the member 47 are assembled thereon and the projection 95 on the underside of the protractor plate shown in Figs. 3 and 6 and which extends into a slot 96 in the flange 48 of the member 47 merely assists in locating the members during assembly.

Provision is made for locking the index notcher member in inoperative position when it is not desired to use it. For this purpose the inner end of the slot 83 is provided with a portion 97 extending rearwardly at an acute angle to the length of the slot proper, into which portion the lower end of the pin 72 can be engaged by depressing and then rocking the thumb piece 70 about the pin 71 as a pivot. The indexing mechanism just described is claimed in my aforementioned copending application Serial No. 745,800, filed May 3, 1947, now Patent No. 2,662,291, issued December 15, 1953.

From the foregoing disclosure, it will be apparent that the objects of the invention heretofore enumerated and others have been accomplished and that there has been provided a novel and improved drafting machine and instrument head for drafting machines and the like. While the preferred embodiments of the invention have been described in considerable detail, I do not wish to be limited to the particular constructions shown which may be varied within the scope of this invention and it is my intention to cover hereby all adaptations, modifications and uses thereof which come within the practice of those skilled in the art to which the invention relates and within the scope of the appended claims.

Having thus described my invention, I claim:

1. In a drafting or like device, the combination of a protractor ring assembly, a ruler or instrument assembly comprising a spindle member rotatably supported in said protractor ring assembly and comprising a hand grasp operatively connected to the upper end of said spindle member, an instrument holding member rotatably supported adjacent to the lower end of said spindle member, one of said members having an annular aperture therein, a concave resilient member nonrotatably connected at its central portion to the other of said members and having opposite outer edges engageable with opposite sides of said aperture, the outer portions of said concave member being shiftable relative to the central portion thereof axially of said spindle member to move said outer edges radially into clamping engagement with the walls of said aperture, a rod-like member operatively connected to said instrument holding member and extending upwardly through said spindle member, and means connected to the upper end of said rod-like member for moving the same in a direction upwardly relative to said spindle member whereby said instrument holding member is moved towards said spindle member to clamp said instrument holding member to said spindle member.

2. In a drafting or like device, the combination of a member, a ruler or instrument assembly comprising a spindle rotatably supported in said member and having a hand grasp operatively connected to the upper end of said spindle, an instrument holding member rotatably supported adjacent to the lower end of said spindle and having an aperture therein, a concave resilient member operatively connected to said spindle adjacent to the lower end thereof and having its outer edges engageable with the peripheral walls of said aperture, the outer portions of said concave member being shiftable relative to the central portion thereof to move said outer edges radially into clamping engagement with the walls of said aperture, a rod operatively connected to said instrument holding member and extending upwardly through said spindle, and a lever adapted to normally lie flush with the upper surface of said hand grasp and connected to the upper end of said rod for moving the same in a direction upwardly through said spindle whereby said rule holding member is moved toward said concave resilient member to tightly clamp said instrument holding member to said spindle.

3. In a drafting or like device, the combination of a member, a ruler or instrument assembly comprising a spindle rotatably supported in said member and having a hand grasp operatively connected to the upper end of said spindle, an instrument holding member rotatably supported adjacent to the lower end of said spindle and having a counterbore in the upper face thereof, a concave resilient member operatively connected at its central portion to said spindle adjacent to the lower end thereof and having opposite outer edges movable radially thereof by shifting the plane of said edges axially relative to said spindle and engageable with opposite sides of said counterbore, a rod operatively connected to said instrument holding member and extending upwardly through said spindle, and means on the upper end of said rod for moving the same in a direction upwardly through said spindle whereby said rule holding member is moved toward said concave resilient member to tightly clamp said instrument holding member to said spindle.

References Cited in the file of this patent

UNITED STATES PATENTS

| 261,887 | Whitney | Aug. 1, 1882 |
| 1,047,011 | Elliott | Dec. 10, 1912 |

FOREIGN PATENTS

| 496,573 | Great Britain | Dec. 5, 1938 |